(12) United States Patent
Beck et al.

(10) Patent No.: US 8,413,950 B2
(45) Date of Patent: Apr. 9, 2013

(54) ACTUATING SOLENOID AND NON-STICK DISK

(75) Inventors: Thorsten Beck, Graefendorf (DE); Matthias Kissner, Ruppertshuetten (DE)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 12/489,876

(22) Filed: Jun. 23, 2009

(65) Prior Publication Data

US 2009/0314977 A1  Dec. 24, 2009

(30) Foreign Application Priority Data

Jun. 24, 2008  (DE) .......................... 10 2008 029 979

(51) Int. Cl.
*F16K 31/00* (2006.01)

(52) U.S. Cl. ...................... 251/64; 251/129.07; 335/257

(58) Field of Classification Search .................... 251/64, 251/129.07; 411/545; 335/257, 277
See application file for complete search history.

(56) References Cited

U.S. PATENT DOCUMENTS

| | | | | |
|---|---|---|---|---|
| 1,143,091 | A * | 6/1915 | Stimpson | 411/545 |
| 4,053,265 | A * | 10/1977 | Wulker et al. | 425/20 |
| 5,076,326 | A * | 12/1991 | McCabe | 335/257 |
| 5,553,829 | A * | 9/1996 | Hemsen | 251/129.21 |
| 6,267,350 | B1 * | 7/2001 | Slawinski et al. | 251/64 |
| 6,315,268 | B1 | 11/2001 | Cornea et al. | |
| 6,824,225 | B2 * | 11/2004 | Stiffler | 299/104 |
| 7,040,594 | B2 * | 5/2006 | Hironaka | 251/50 |
| 7,159,843 | B1 * | 1/2007 | Mullally et al. | 251/129.16 |

FOREIGN PATENT DOCUMENTS

| | | |
|---|---|---|
| DE | 19934846 | 1/2001 |
| WO | WO-9962084 | 12/1999 |

OTHER PUBLICATIONS

Klaus-Dieter Linsmeier: "Die Bibliothek der Technik" [The library of technology], vol. 118; publlished by Verlag Moderne Industrie, 1995.

German Patent Office, Extended German Search Report in German Patent Application No. 10 2008 029 979.0 (Jan. 30, 2009).

* cited by examiner

*Primary Examiner* — Eric Keasel

(74) *Attorney, Agent, or Firm* — Leydig, Voit & Mayer, Ltd.

(57) ABSTRACT

An actuating solenoid and a non-stick disk by means of which adhesion of an armature of an actuating solenoid to a pole core can be prevented. The non-stick disk is provided with at least one oil channel through which oil can be fed into the contact area between the non-stick disk and the armature or the pole core.

2 Claims, 2 Drawing Sheets

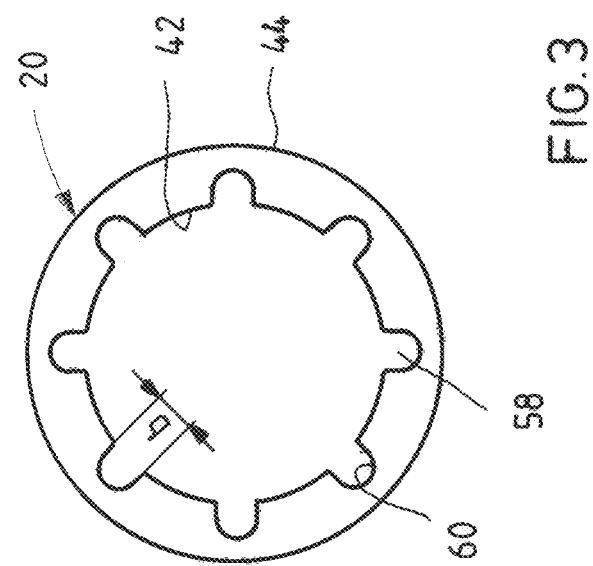
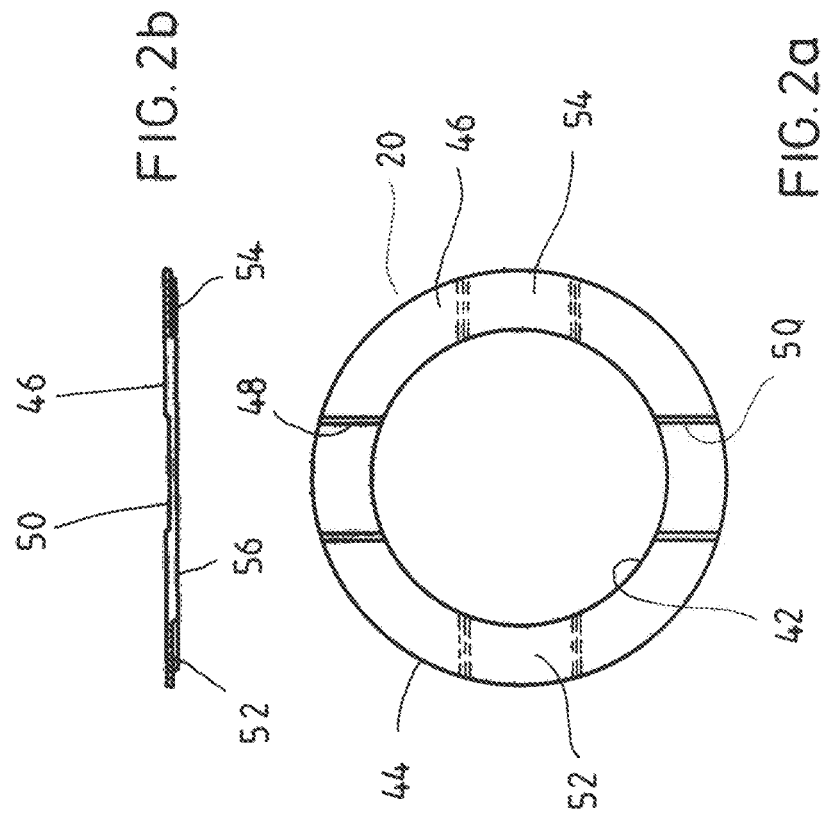

ACTUATING SOLENOID AND NON-STICK DISK

Priority is claimed to German Patent Application No. DE 10 2008 029 979.0, filed Jun. 24, 2008, the contents of which are hereby incorporated by reference in their entirety.

FIELD OF THE INVENTION

The present invention relates generally to an actuating solenoid and a non-stick disk for an actuating solenoid. More specifically, the present present invention relates to an actuating solenoid and a non-stick disk by means of which adhesion of an armature of an actuating solenoid to a pole core can be prevented.

BACKGROUND OF THE INVENTION

An actuating solenoid of the generic type is employed, for example, as a solenoid actuator or proportional solenoid for directional control valves in order to adjust their valve spools. The basic structure of such an actuating solenoid is explained, for example, in WO 99/62084. According to this publication, an actuating solenoid has a pole tube that accommodates an armature which can be moved axially and by means of which the valve spool can be adjusted directly or indirectly. The pole tube is surrounded by a coil so that, when the coil is energized, the armature can be moved out of its spring-biased initial position.

The function and the structure of a pole tube are known from the book titled "Die Bibliothek der Technik" [The library of technology], volume 118; Linsmeier, Klaus-Dieter; published by Verlag Moderne Industrie, 1995. According to this publication, a pole tube of an actuating solenoid has a pole core on its face and is joined to a tube piece or yoke by means of a spacing ring made of non-magnetic material. An armature is accommodated movably inside the pole tube, the end stroke position (operating stroke) of the armature being determined by the contact to a face of the pole core or to an inserted non-stick disk. In the transition area between the spacing ring and the pole core, a so-called control cone is formed that widens in the direction of the stroke. The geometry of this control cone is selected in such a way that the characteristic curve of the solenoid runs essentially linearly. Normally, the interior of the pole tube is charged with a high pressure that corresponds, for instance, to that of the associated valve-controlled system pressure.

When the coil is de-energized, the armature is moved by the spring bias out of its contact position on the pole core in the direction of its initial position. The non-stick disk arranged between the pole core and the face of the armature is intended to prevent the armature from adhering to the pole core. During this backward movement of the armature, the oil contained in the pole tube has to flow out of the decreasing part of the armature space and into the increasing part of the armature space that is delimited by the above-mentioned face of the armature. The disable time, that is to say, the time that the armature needs to move out of its stroke position in the direction of its initial position, should be as short as possible, so that the valve exhibits adequate response characteristics. One prerequisite for a short disable time is that the above-mentioned oil equalization between the armature spaces has to take place as quickly as possible. In actual practice, it has proven that this oil equalization cannot be performed at the requisite speed by means of the above-mentioned solutions.

SUMMARY OF THE INVENTION

An aspect of the present invention is to provide an actuating solenoid as well as a non-stick disk suitable for such an actuating solenoid, with which the disabling times can be minimized.

The present invention provides an actuating solenoid for a solenoid valve, comprising a pole tube in which an armature that runs in oil is movably accommodated, whereby a non-stick disk is arranged between a pole core and a face of the armature, characterized in that the non-stick disk is configured with at least one oil channel through which oil can flow into a contact area between the non-stick disk and the pole core or the armature face.

The present invention also provides a non-stick disk having an inner circumferential edge and an outer circumferential edge between which there is at least one oil channel.

According to the invention, the actuating solenoid has a pole tube in which an armature that runs in oil is accommodated so as to move axially. The maximum operating stroke of the armature is limited by contact with a face of a pole core, whereby a non-stick disk is arranged in the contact area between the pole core and the face. According to the invention, this non-stick disk is configured with at least one oil channel through which oil can flow into the contact area when the armature is moved away from or towards the pole core, so that the lifting movement of the armature is assisted, thus ensuring a very fast oil equalization during the next movement of the armature. Accordingly, the solution according to the invention can attain very short disabling times with minimal technical effort.

In principle, the non-stick disk can be positioned loosely on the armature or on the pole core. Accordingly, the at least one oil channel is then provided in the face of the non-stick disk facing the armature or facing the pole core.

This non-stick disk is preferably configured to be ring-shaped. Here, it is preferred if the disk has at least one radial channel that extends along one face from an inner circumferential edge to an outer circumferential edge.

The production of the non-stick disk is particularly simple if the radial channel is created by embossing.

The oil equalization can take place especially quickly if several oil channels are provided that are offset with respect to each other.

In a preferred embodiment of the invention, each face of the non-stick disk has two, preferably coaxially positioned, oil channels, so that, irrespective of the installation position, two channels are always operative, thus reliably ruling out assembly mistakes.

In principle, the channels can be created by a machining process instead of by embossing.

In another alternative solution, instead of radial channels, notches are provided that extend uniformly away from the inner circumferential edge towards the outer circumferential edge but, in a preferred embodiment, they end at a distance from the outer circumferential edge.

Such notches are particularly easy to create when they are produced with a round crown, preferably by means of stamping.

Since these notches do not extend over the entire radial width of the non-stick disk, in order to assist the oil equalization, an oil chamber delimited by a neck or bevel can be formed in the contact area on the pole core or on the armature, and the oil channel created by the notches opens into said chamber, so that the oil enters the above-mentioned oil chambers radially from the inside via the notches of the non-stick disk.

The non-stick disk according to the invention is made of a non-magnetic material, for instance, stainless steel, aluminum, brass or plastic.

Other advantageous refinements of the invention are the subject matter of additional subordinate claims.

BRIEF DESCRIPTION OF THE DRAWINGS

Preferred embodiments of the invention will be explained in greater detail below making reference to the schematic drawings. These show the following:

FIGS. 2a, 2b—views of a first embodiment of a non-stick disk of the actuating solenoid from FIG. 1; and FIG. 3—a second embodiment of a non-stick disk for an actuating solenoid according to FIG. 1.

DETAILED DESCRIPTION

Figure 1:
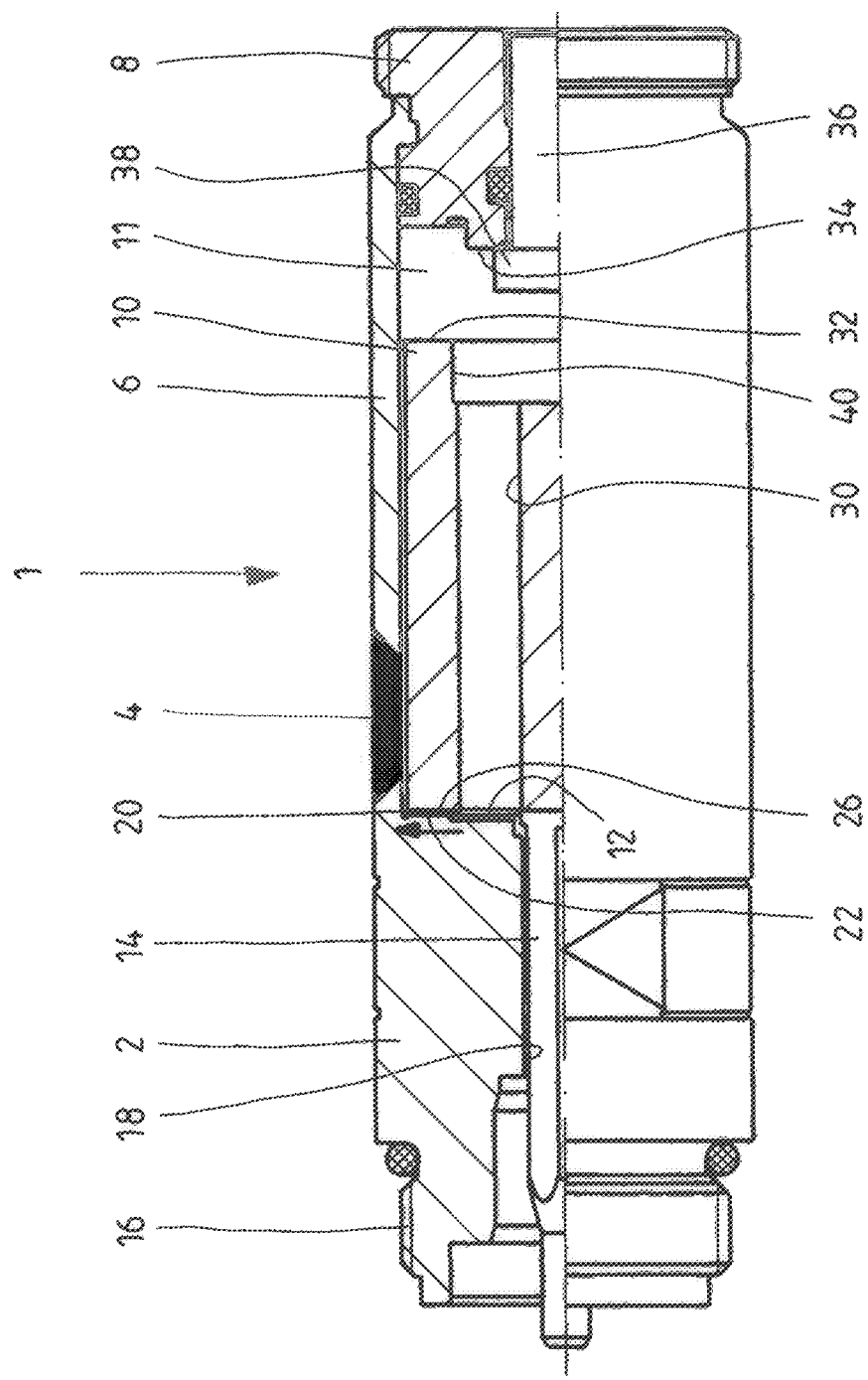
FIG. 1—a half section through part of an actuating solenoid according to the invention.

FIG. 1 shows part of a longitudinal section through a pole tube 1 of an actuating solenoid having a pressure-tight design. The pole tube 1 consists essentially of a pole core 2, a separating ring 4 and a tube piece 6 that is closed off by means of a closure piece 8. In the embodiment shown, this closure piece 8 is joined to the tube piece 6 by shaping, for example, by rolling or crimping, and serves to limit the stroke of an armature 10 that is accommodated so as to be axially movable in an armature space 11 that has an air gap 12 and that is delimited by the pole core 2, the pole piece 6 and the closure piece 8. A tappet 14 is attached to the armature 10, it passes through the pole core 2 in the axial direction and it is directly or indirectly joined to a control spool of a valve in order to actuate the latter. In principle, it is also possible to configure the tappet 14 as a separate component so that the armature 10 then strikes against the tappet 14.

The end section of the pole tube 1 shown on the left-hand side in FIG. 1 has a thread 16 by means of which said pole tube can be screwed into a valve hole of a valve housing, so that the tappet 14 operationally interacts with the control spool of the valve. The tappet 14, which in the presented embodiment is designed with a rectangular cross section towards the outside for purposes of oil equalization, passes through a through hole 18 of the pole core 2 which, on the one hand, widens stepwise in the area of the thread 16 and, on the other hand, opens into the armature space 11. Between an armature face 26 and an annular face 22 of the pole core 2 that axially projects somewhat forward, a non-stick disk 20 is provided that prevents magnetic and hydraulic adhesion of the armature 10 in its end stroke area and that delimits the armature for purposes of linearizing the characteristic curve.

The part of the armature space 11 that is delimited by the pole core 2 and the armature face 26 and that is arranged to the left of the armature 10 is connected via an through hole 30 to the part of the armature space 11 that is shown on the right-hand side in FIG. 1 and that is delimited by the rear face 32 of the armature 10 and by the adjacent surface 34 of the closure piece 8. A manual emergency pin 36 that passes through the closure piece 8 serves to manually operate the valve, for instance, in case of a power failure. A radially widened head 38 of the manual emergency pin 36 protrudes into a bore 40 of the armature 10 when the latter is in an initial position.

The pole tube 1 is surrounded by a coil (not shown here) so that, when this coil is energized, the armature can be moved out of its prescribed initial position against the force of the centering spring arrangement in the direction of the end stroke position shown in FIG. 1.

The separating ring 4 is made of non-magnetizable material, for instance, austenitic steel, brass or bronze. The pole core 2, the tube piece 6 and the armature 10, in contrast, are made of magnetizable material, for example, conventional machining steel. A relatively high pressure is present in the armature space 11, said pressure being determined by the system pressure that is to be switched by the valve.

For the sake of simplicity, reference is hereby made to the above-mentioned state of the art regarding further details about the structure of an adjustable actuating solenoid.

The structure of the non-stick disk 20 will be elaborated upon below on the basis of the FIGS. 2a, 2b and 3.

FIG. 2a shows a top view of a non-stick disk 20 of the type that can be employed for an actuating solenoid according to FIG. 1. FIG. 2b shows the non-stick disk 20 in a bottom view, that is to say, a view from below, of the depiction according to FIG. 2a.

The non-stick disk 20 is configured to be ring-shaped, with an inner and outer circumferential edge 42, 44, and it passes through the inner circumferential wall of the tube piece 6, of the spacer ring 4 and of the ring shoulder 24.

According to the depiction shown in FIG. 2, the face 46 of the non-stick disk 20 facing the observer has two diametrically arranged oil channels 48, 50. Two corresponding oil channels 52, 54 are formed on the rear face 56 facing away from the observer. The axis of the two latter oil channels 52, 54 are arranged so as to be offset by 90° relative to the two former oil channels 48, 50. In the embodiment shown, these oil channels 48, 50, 52, 54 are formed on the non-stick disk by means of an embossing procedure. In principle, however, these oil channels can also be created in a familiar manner by means of milling or the like.

The alternating arrangement of the channels 48, 50 and 52, 54 has the advantage that there is no need to pay attention to the orientation when the non-stick disk is installed in order for two of these channels 48, 50 and 52, 54 to always be facing the armature 10.

As mentioned above, in the end stroke position of the actuating solenoid, the face 26 of the armature 10 lies against the face 22 of the pole core 2, whereby the non-stick disk 20 is formed in the contact area. In conventional solutions, the non-stick disk 20 is configured as a flat disk, so that, in the contact position, practically no oil remains between the armature 10 and the non-stick disk 20 or the pole core 2. Even though solutions are known in which channels are provided in the pole core 2, this calls for considerable technical effort in terms of their production. With the solution according to the invention, the oil can pass through the through hole 18 and can reach the air gap 58 that remains on the face between the center projection of the armature 10 and the corresponding recess of the pole core 2 towards the non-stick disk 20, where it passes through the oil channels 48, 50 (52, 54) in the direction of the arrow radially towards the outside and can then reach the circumferential air gap 12. In other words, thanks to the oil feed made possible via the oil channels 48, 50; 52, 54 of the non-stick disk 20, mechanical and hydraulic adhesion of the armature 10 to the pole core 2 or to the non-stick disk 20 can be reliably prevented, so that, when the coil is de-energized, the armature 10 is moved back to its initial position by the centering spring arrangement without any perceptible delay, then making contact with the closure piece 8.

A drawback of the embodiment shown in FIGS. 2a, 2b could lie in the embossing procedure since, even when executed with the greatest of care, it is not possible to rule out embossing elevations that impair the contact with the armature 10 or with the pole core 2.

In order to eliminate this drawback, a non-stick disk according to FIG. 3 can be employed with which flat contact is ensured. This non-stick disk 20 is likewise configured to be ring-shaped, whereby, starting from the inner circumferential edge 42, numerous notches 58 are created that extend all the way to the outer circumferential edge 44, but that end at a radial distance from the edge. The crown 60 of the notches 58 in the embodiment shown is configured as a circular arc, whereby the diameter of the clearance b corresponds to the notches 58. In the presented embodiment, eight notches 58 are evenly distributed along the circumference of the non-stick disk 20. Of course, the distribution, number and geometry of the notches 58 can vary.

These notches 58 likewise form part of a flow path along which the oil can enter the contact area between the non-stick disk 20 and the armature 10, so that hydraulic and mechanical adhesion of the armature 10 can be reliably prevented. In the embodiment shown in FIG. 3, this oil feed to the contact area can be further improved if a space into which the oil from the notches 58 can enter is formed in the area delimited between the crowns 60 and the outer circumferential edge of the non-stick disk 20 by appropriately configuring the armature 10 or the like, so that the oil is effective in the radial direction in sections along the entire width of the non-stick disk 20.

The present document discloses an actuating solenoid and a non-stick disk by means of which adhesion of an armature of an actuating solenoid to a pole core can be prevented. According to the invention, the non-stick disk is provided with at least one oil channel through which oil can be fed into the contact area between the non-stick disk and the armature or the pole core.

List Of Reference Numerals
1 pole tube
2 pole core
4 separating ring
6 pipe piece
8 closure piece
10 armature
11 armature space
12 air gap
14 tappet
16 center thread
18 through hole
20 non-stick disk
22 face
26 armature face
30 through hole
32 rear face
34 surface
36 manual emergency pin
38 head
40 bore
42 inner circumferential edge
44 outer circumferential edge
46 face
48 oil channel
50 oil channel
52 oil channel
54 oil channel
56 face
58 notch
60 crown The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of which are incorporated herein by reference in their entireties for all purposes.

What is claimed is:

1. An actuating solenoid for a solenoid valve, comprising:
   a pole tube having a pole core;
   an armature movably accommodated in the pole tube;
   a non-stick disk disposed in a contact area between the pole core and an end face of the armature, the non-stick disk including at least one oil channel formed by a plurality of notches that are uniformly distributed about a circumference of the non-stick disk, the notches extending uniformly away from an inner circumferential edge of the non-stick disk in a radial direction and ending at a distance from an outer circumferential edge of the non-stick disk, the at least one oil channel being configured to allow oil to flow into the contact area between the non-stick disk and the end face of the armature; and
   an oil chamber delimited by one of a neck and a bevel formed in the contact area in one of the pole core and the armature, the at least one oil channel opening into said oil chamber radially from the notches such that oil is effective in the radial direction across an entire width of the non-stick disk.

2. The actuating solenoid as recited in claim 1, wherein the non-stick disk is ring-shaped.

* * * * *